Nov. 19, 1957  H. B. BILLETT  2,813,982
COSINE CORRECTING COVER FOR PHOTOELECTRIC CELL
Filed Nov. 10, 1952

Inventor:
Harry B. Billett,
by Vernet C. Kauffman
His Attorney

United States Patent Office 2,813,982
Patented Nov. 19, 1957

2,813,982
COSINE CORRECTING COVER FOR PHOTOELECTRIC CELL

Harry B. Billett, Lyndhurst, Ohio, assignor to General Electric Company, a corporation of New York Application November 10, 1952, Serial No. 319,754

5 Claims. (Cl. 250—220)

The present invention relates generally to light meters and more particularly to light transmitting means for the cosine correction of light meters comprising photoelectric cells of the barrier layer type for making illumination measurements.

As disclosed in Patent No. 2,522,987, issued September 19, 1950, to Gaylord B. Buck II and assigned to the assignee of the present application the spectral sensitivity curve of such cells is different from the spectral sensitivity curve of the average human eye. This can be corrected by a simple color filter. Also the cells do not respond as much as they should to light incident on their light sensitive surfaces at oblique angles to the normal at the point of incidence in order for a light meter in which such a cell is used to correspond to the values of the cosine curve.

Thus, accurate measurements of illumination produced on a surface by light from a number of spaced apart sources cannot be made by light meters incorporating such cells unless means is provided to correct the color sensitivity of the cell and the response of the cell to obliquely incident light.

It has been proposed heretofore to correct this last defect by covering the light sensitive surface of the cell with a light diffusing medium or with a lense shaped to correct the response of the cell to such obliquely incident light. Neither of these solutions of the problem have proven practical however because the light diffusing mediums available absorb too much light and the lens is effective only when the reflections at the interfaces of the lens, the usual color correcting filter and the cell surface are minimized by cementing these members together to produce a laminated cell structure. This is difficult and expensive to accomplish.

The principal object of the present invention is to provide a separate cover for the usual separate color correcting filter and the light sensitive surface of a photoelectric cell of the barrier layer type which cover combines a high transmission for normal and near normal light with sufficient diffusion for the oblique light to correct the response of the cell to such oblique light. Further objects and advantages of the invention will appear from the following description of a species thereof.

A specific form of cover embodying the invention is one consisting of a clear, light transmitting, generally flat body having transparent, regular, plane, parallel top and bottom surfaces with spaced intersecting grooves normal to each other and forming a network in its bottom surface. The grooves have unpolished side surfaces for diffusing light passing through said cover and intercepting the surfaces of the grooves.

The spacing and width of the grooves is such that the total projected grooved area of the said bottom surface relative to the total area of said surface is in the ratio of about 1 to 2 so that most of the light coming to the light sensitive cell surface at normal and near normal angles of incidence passes through the parts of the cover between the grooves without diffusion and with but little absorption for exciting the photoelectric cell. The absorption of such light by the cover thus is substantially less than the absorption thereof by a medium by which all of such light is diffused and the cover of the present invention is useful in present commercial light meters in which mediums diffusing all such light cannot be used.

The unpolished side surfaces of the grooves intercept and diffuse light coming to the light sensitive cell surface at grazing or near grazing angles to increase the amount of such light transmitted by the cover and thereby correct the response of the cell to such light so that the light meter follows the values of the cosine curve all as explained hereinafter.

In the drawing accompanying and forming part of this specification a species of cover embodying the invention is shown, in which.

Figure 1:
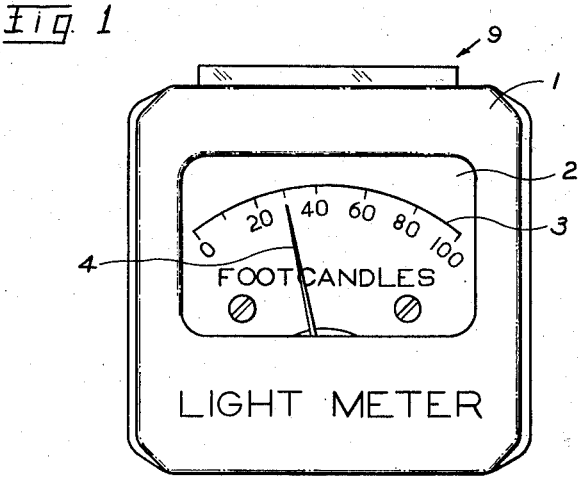
Fig. 1 is a front elevational view of a light meter equipped with a species of cover of the present invention.

Referring to Fig. 1 of the drawing the light meter comprises an opaque casing 1 of electrically insulating material, such as an organic plastic, having an opening 2 in its front face which opening is covered by a transparent glass and behind which are positioned the dial 3 and the indicating needle 4 of a microammeter (not shown) mounted within the casing 1. The dial 3 is calibrated so as to be readable directly in foot candles.

The top of the casing 1 has a rectangular shaped aperture therein the sides 5 (Fig. 2) of which are provided with grooves 6 for accommodating the edge portions of the light sensitive cell 7 and the shoulder 8 of the rectangular shaped light transmitting cover 9. The cell 7 together with the cover 9 is held firmly in the grooves with a part 10 of the cover 9 extending upward through the aperture in the casing 1 and with the usual color filter 11 sandwiched between cell 7 and cover 9 by a curved resilient metal holding member 12 pressing against the bottom of the cell 7 and the bottom of the groove 6 in the shorter sides of the aperture as shown in Fig. 2.

The holding member 12 also serves as an electrical conductor between the cell 7 and the microammeter (not shown) in the casing 1 and mounted below the cell. The said member 12 is provided with an outwardly extending contact 13 for engaging an electrical terminal of the microammeter as is conventional in such light meters. The other contact of the cell 7 is constituted by a rectangular metal strip 14 conforming in size and shape to the edges of the rectangular cell 7 and this contact member is clamped between the cell and the filter 11 mounted over the cell. A contact portion 15 is provided on the rectangular strip 14 for engaging the other terminal of the microammeter.

Figure 2:
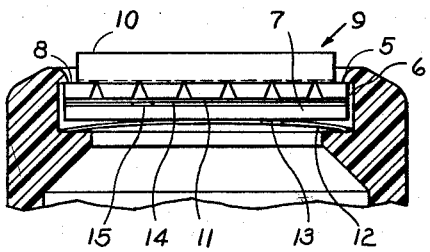
Fig. 2 is a fragmentary, partly sectional view of the upper part of the light meter shown in Fig. 1.

The light meter illustrated in Figs. 1 and 2, with the exception of the cover 9, is of a type now commercially available and well known in the art and has a removable back cover which facilitates insertion of the cell 7, the filter 11 and the cover 9 in the grooves 6 in the casing 1.

The light sensitive cell 7 is made up of a support strip of iron coated on its upper surface with a layer of selenium and a thin light pervious coating of silver or other suitable noble metals and has near its edges electrical contacts of evaporated cadmium which are electrically connected by the metal strip contact 14 described above. Light striking the selenium layer causes the latter to generate a current of electricity the magnitude of which is measured by the microammeter connected to the contacts 13 and 14 as described above.

Such cells are commercially available and the characteristics thereof are well known.

In accordance with my invention the light transmitting cover 9 completely covering the filter 11 and the light sensitive surface of the cell 7 is made up of a single piece of clear organic plastic, such as methyl methacrylate, and is constituted by a main body portion 10 in the shape of a tablet and a thinner grooved portion 16 having larger transverse and longitudinal dimensions than the body portion 10 to form the shoulder 8 for engaging the slots 6 in the casing 1 to hold the cover 9 on the said casing.

Figure 3:
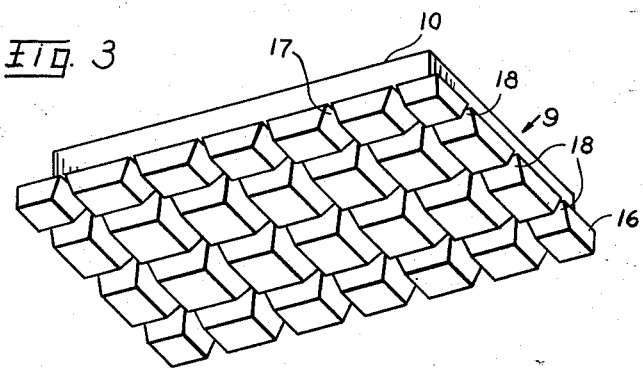
Fig. 3 is a perspective view of the cover shown in Figs. 1 and 2 and as seen from below.

The transverse and longitudinal grooves 17 and 18, respectively (Fig. 3) in the portion 16 of the cover 9 are V-shaped and extend in parallel positions the full length and width of the portion 16. The apices of the V-shaped grooves are within the body portion 10 of the cover. For example, when the portion 16 of the cover is 0.1 inch thick, the depth of the grooves 17 and 18 is 0.105 inch so that the grooves extend into the body portion of the cover a distance of 0.005 inch. Of course, the grooves are open at the shoulder 8, but this is immaterial as the shoulder 8 is covered by the sides 5 of the casing 1.

The grooved portion 16 of the cover is 1.7 inches long and 0.88 inch wide whereas the body portion 10 thereof is 1.55 inches long and 0.73 inch wide. The shoulder 8 is .075 inch wide at all parts thereof. The body portion 10 is made 0.210 inch thick so as to extend through the aperture in the casing 1.

The apex of each of the outer longitudinal grooves 18 is 0.2 inch from the longitudinal edges of the portion 16 and the distance between the apices of the three grooves 18 is 0.24 inch. The apex of each of the transverse grooves 17 at the ends of portion 16 is 0.2 inch from the transverse edges of the portion 16 and the six grooves 17 are spaced 0.26 inch apart at their apices.

The grooves 17 and 18 are cut in the portion 16 by a 45 degree rotary cutter rotated at a speed of about 520 revolutions per minute with the blank fed to the cutter at the rate of about 5½ inches per minute. The surfaces of the grooves are not polished after cutting but on the contrary are left rough as machined to diffuse the light passing therethrough. The sides of the body portion 10 are also left rough as machined for the same purpose.

In calculating the ratio of total projected grooved area to the total area of the botom surface of portion 16 only the parts of these areas lying under body portion 10 are considered because shoulder 8 is covered by the opaque sides 5 of casing 1. When so calculated the total effective projected grooved area is 0.531 square inch and the total effective clear area is 1.1315 square inches.

The total effective length of the transverse grooves 17 is approximately equal to the total effective length of the longitudinal grooves 18 so that the areas of the light diffusing surfaces in both directions are approximately equal. The meter thus will read the same and will accurately measure the illumination even when the meter is rotated with the light sensitive surface of cell 7 held in a plane at a given angle to the sources producing the illumination to be measured.

The above described cover is intended for use with the usual color filter, shown at 11 in Fig. 2, for correcting the color response of the cell so that the latter follows the spectral sensitivity curve of the human eye. The filter commercially known as the No. 102 Gelatin Laquered Wratten Filter and listed and sold under this designation by the Eastman Kodak Co. is suitable for this purpose.

The grooves 17 and 18 in the portion 16 give the cover 9 some of the characteristics of a prismatic lens since the light is bent as it emerges from the surface of the grooves into the air. The cover 9, therefore, in one of its aspects acts as a lens.

I have demonstrated that a light meter incorporating the above described elements follows the cosine curve almost exactly. For example, between angles of incidence of 0 and 25 degrees to the normal the response of the cell 7 matches the cosine curve exactly; between 25 degrees and 60 degrees the response of the cell is correct to within 98 percent, and between 60 and 90 degrees the response is correct to within 96 percent. The values of the cosine curve are determined by the formula $$E = \frac{I}{d^2} \cos i$$

where E is the illumination, I is the intensity of the light, $d$ is the distance from the light source and $i$ is the angle between the incident ray and the normal to the surface at the point of incidence.

Obviously the cover 9 may be of different shape, circular, for example, than that shown for use in other types of light meters. Also, the shape of the grooves 17 and 18 in cross section, and the depth and numbers of the grooves may be changed in order to adapt the cover for the cosine correction of light sensitive cells having different characteristics than the type of cell described above and shown at 7 in the drawing and with light filters different from the filter 11.

What I claim as new and desire to secure by Letters Patent of the United States is:

1. In combination a photoelectric cell of the barrier layer type and a light transmitting cover for the light sensitive surface thereof comprising a clear, generally flat body of light transmitting material having transparent, parallel, regular top and bottom surfaces and provided with spaced parallel intersecting grooves normal to each other and forming a network in its bottom surface, the surfaces of said grooves being light diffusing and inwardly convergent, the projected effective area of said grooves relative to the total effective area of said transparent bottom surface being in the ratio of about 1 to 2 whereby a substantial amount of light coming to the light sensitive surface of the cell at normal and near normal angles of incidence passes through the transparent top and bottom surfaces of said clear cover without diffusion and light coming to said cell surface at oblique angles to the normal is intercepted and diffused by said diffusing groove surfaces to increase the amount of such oblique light transmitted by said cover and reaching said cell surface to effect cosine correction of the cell.

2. In combination a photoelectric cell of the barrier layer type and a light transmitting cover for the light sensitive surface thereof comprising a clear, generally flat body of light transmitting material having transparent, parallel, regular top and bottom surfaces and provided with spaced parallel intersecting grooves normal to each other and forming a network in its bottom surface, the surfaces of said grooves being light diffusing and inwardly convergent at an angle of about 45 degrees, the projected area of said grooves being substantially less than the area of said transparent bottom surface whereby a substantial amount of light coming to the light sensitive surface of the cell at normal and near normal angles of incidence passes through the transparent top and bottom surfaces of said clear cover without diffusion and light coming to said cell surface at oblique angles to the normal is intercepted and diffused by said diffusing groove surfaces to increase the amount of such oblique light transmitted by said cover and reaching said cell surface to effect cosine correction of the cell.

3. In combination a photoelectric cell of the barrier layer type and a light transmitting cover for the light sensitive surface thereof comprising a clear, generally flat body of light transmitting material having transparent, parallel, regular top and bottom surfaces and provided with spaced parallel intersecting grooves normal to each other and forming a network in its bottom surface, the surfaces of said grooves being light diffusing and inwardly convergent, the projected area of said grooves being substantially less than the area of said transparent bottom surface and the total length of the parallel grooves extending in one direction being equal to the total length of the grooves normal thereto, whereby a substantial amount of light coming to the light sensitive surface of the cell at normal and near normal angles of incidence passes through the transparent top and bottom surfaces of said clear cover without diffusion and light coming to said cell surface from any direction at oblique angles to the normal is intercepted and diffused by said diffusing groove surfaces to increase the amount of such oblique light transmitted by said cover and reaching said cell surface to effect cosine correction of the cell.

4. A light meter comprising a casing containing a photoelectric cell of the barrier layer type mounted with its light sensitive surface facing a rectangular aperture in said casing and a light transmitting cover over said aperture comprising a clear main body portion conforming in shape to said aperture, being of sufficient depth to extend through and beyond the aperture and having light diffusing sides, a thinner grooved clear portion having larger transverse and longitudinal dimensions than said body portion to form a shoulder on said cover engaging the casing, the top and bottom surfaces of said cover being transparent, regular and parallel and the said bottom surface being provided with spaced parallel intersecting grooves normal to each other and forming a network in said surface, the surfaces of said grooves being light diffusing and inwardly convergent at an angle of about 45 degrees, the projected effective area of said grooves relative to the total effective area of said transparent bottom surface being in the ratio of about 1 to 2 and the total length of the parallel grooves extending in one direction being equal to the total length of the grooves normal thereto whereby a substantial amount of light coming to the light sensitive surface of the cell at normal and near normal angles of incidence passes through the transparent top and bottom surfaces of said clear cover without diffusion and light coming to said cell surface from any direction at oblique angles to the normal is intercepted and diffused by said diffusing groove surfaces to increase the amount of such oblique light transmitted by said cover and reaching said cell surface to effect cosine correction of the cell.

5. A light meter comprising a photoelectric cell of the barrier layer type, a color correcting filter mounted over the light sensitive surface of the cell, a light transmitting cover mounted over said filter, and support means for holding the aforesaid members juxtaposed, said cover comprising a clear, generally flat body of light transmitting material having transparent, parallel, regular top and bottom surfaces and provided with spaced parallel intersecting grooves normal to each other and forming a network in its bottom surface, the surfaces of said grooves being light diffusing and inwardly convergent, the projected area of said grooves being substantially less than the area of said bottom surface whereby a substantial amount of light coming to the light sensitive surface of the cell at normal and near normal angles of incidence passes through the transparent top and bottom surfaces of said clear cover without diffusion and light coming to said cell surface at oblique angles to the normal is intercepted and diffused by said diffusing groove surfaces to increase the amount of such oblique light transmitted by said cover and reaching said cell surface to effect cosine correction of the cell.

References Cited in the file of this patent
UNITED STATES PATENTS

| | | |
|---|---|---|
| 586,249 | Soper | July 13, 1897 |
| 1,506,729 | Stewart | Aug. 26, 1924 |
| 2,137,466 | Tonnies | Nov. 22, 1938 |
| 2,248,758 | Higgonet et al. | July 8, 1941 |
| 2,298,667 | Weymouth | Oct. 13, 1942 |